United States Patent
Subramaniam et al.

(10) Patent No.: US 10,795,736 B2
(45) Date of Patent: Oct. 6, 2020

(54) CROSS-CLUSTER HOST REASSIGNMENT

(71) Applicant: VMware, Inc., Palo Alto, CA (US)

(72) Inventors: Sabareesh Subramaniam, Fremont, CA (US); Dragos Misca, San Francisco, CA (US); Pranshu Jain, Sunnyvale, CA (US); Arpitha Dondemadahalli Ramegowda, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 112 days.

(21) Appl. No.: 16/216,548

(22) Filed: Dec. 11, 2018

(65) Prior Publication Data
US 2020/0183758 A1    Jun. 11, 2020

(51) Int. Cl.
*G06F 9/455* (2018.01)
*G06F 9/50* (2006.01)
*G06F 9/48* (2006.01)

(52) U.S. Cl.
CPC ........ *G06F 9/5088* (2013.01); *G06F 9/45558* (2013.01); *G06F 9/4856* (2013.01); *G06F 9/505* (2013.01); *G06F 9/5077* (2013.01); *G06F 2009/4557* (2013.01); *G06F 2209/503* (2013.01); *G06F 2209/5022* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 2005/0102676 A1* | 5/2005 | Forrester | G06F 9/505 718/105 |
| 2019/0324820 A1* | 10/2019 | Krishnan | G06F 9/5088 |

* cited by examiner

*Primary Examiner* — Charlie Sun
(74) *Attorney, Agent, or Firm* — Thomas Horstemeyer, LLP

(57) ABSTRACT

Disclosed are various implementations of approaches for reassigning hosts between computing clusters. A computing cluster assigned to a first queue is identified. The first queue can include a first list of identifiers of computing clusters with insufficient resources for a respective workload. A host machine assigned to a second queue can then be identified. The second queue can include a second list of identifiers of host machines in an idle state. A command can then be sent to the host machine to migrate to the computing cluster. Finally, the host machine can be removed from the second queue.

20 Claims, 4 Drawing Sheets

CROSS-CLUSTER HOST REASSIGNMENT

BACKGROUND

Datacenters often organize groups of computers into clusters. Clusters of computers can be used to host applications in a coordinated, yet distributed manner. As a simple example, a website or web application can be hosted by a cluster of servers. Each server in the cluster can host a webserver with access to the same content or functionality provided by the website or web application. Requests from clients can be distributed to individual servers in the clusters, thereby spreading the load across multiple servers in order to maintain acceptable performance for the website or web application.

Clusters, however, are often relatively static. For example, clusters can be able to power-down servers when they are not needed to handle the current load or power-up idle servers to handle increased demand or load. However, adding a new server to a cluster or removing an unnecessary server from a cluster is often a manual task that requires a substantial amount of time to complete. As a result, it can take a substantial amount of time to move a server from a first cluster where the server is under-utilized to a second cluster where extra computing resources are desired or required.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to reassigning computing devices from one cluster to another cluster to match the capacity of a cluster with the demand or load placed on the cluster. Clusters can have a number of computing devices assigned to them in order to host or execute various applications, programs, or other services. However, the demands on the cluster can change over time. For example, as the load on one cluster of computers decreases, the load on another cluster of computers hosting a different application can spike beyond the capacity of the other cluster.

Therefore, various embodiments of the present disclosure allow for reassigning of computing resources, such as servers, between clusters based on the current load of the clusters. For example, when a first cluster is lightly loaded and has a number of underutilized servers, one or more of these servers might be unassigned from the first cluster. These servers could then be transferred or otherwise reassigned to a second cluster which is overcommitted or otherwise has insufficient resources. As part of the transfer or reassignment process, the servers could be configured with the requisite network settings, application settings, or operating system settings for the cluster.

Figure 1:
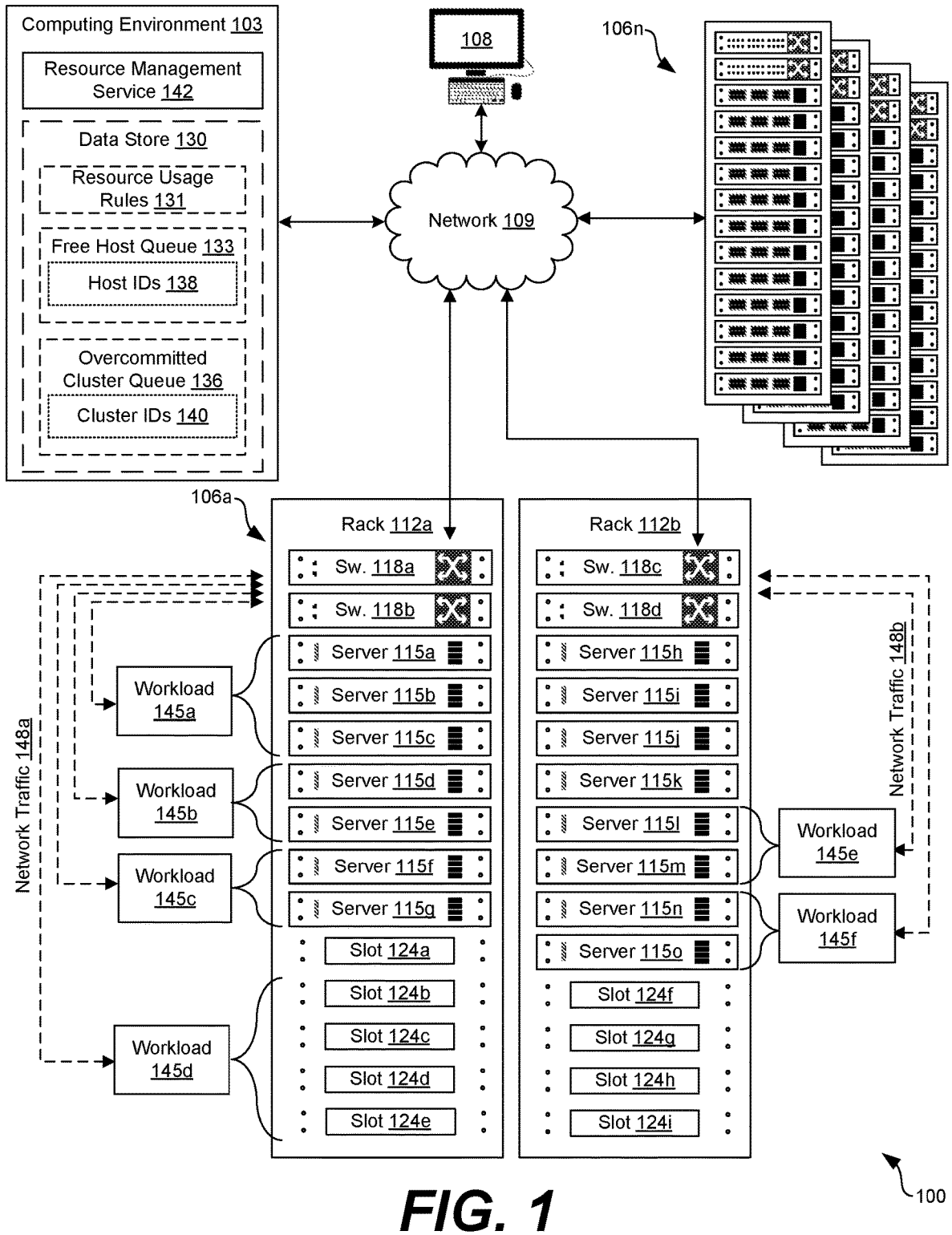
FIG. 1 is a drawing of an example of a virtualization environment having computing clusters capable of executing virtual machines.

With reference to FIG. 1, an example of a networked environment 100 is shown. The networked environment 100 can include a computing environment 103, various computing clusters 106a . . . 106n, and one or more client devices 108 in communication with one other over a network 109. The network 109 can include wide area networks (WANs) and local area networks (LANs). These networks can include wired or wireless components, or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks. As the networked environment 100 can serve up virtual desktops to end users, the networked environment 100 can also be described as a virtual desktop infrastructure (VDI) environment.

In various embodiments, the computing clusters 106 can include a plurality of devices installed in racks 112, such as racks 112a and 112b, which can make up a server bank, aggregate computing system, or a computer bank in a data center or other like facility. In some examples, a computing cluster 106 can include a high-availability computing cluster 106. A high-availability computing cluster 106 is a group of computing devices that acts as a single system and provides a continuous uptime. The devices in the computing clusters 106 can include any number of physical machines, virtual machines, virtual appliances, and software, such as operating systems, drivers, hypervisors, scripts, and applications.

In some examples, the computing environment 103 can include an enterprise computing environment that includes hundreds or even thousands of physical machines, virtual machines, and other software implemented in devices stored in racks 112, distributed geographically and connected to one another through the network 109. It is understood that any virtual machine or virtual appliance is implemented using at least one physical device.

The devices in the racks 112 can include, for example, memory and storage devices, servers 115a . . . 115o, switches 118a . . . 118d, and other computing or network devices. These devices can include graphics cards containing graphics processing units (GPUs, central processing units (CPUs), power supplies, network interfaces, memory, storage, and similar devices. The devices, such as servers 115 and switches 118, can have dimensions suitable for quick installation in slots 124, such as slots 124a . . . 124i, on the racks 112. In various examples, the servers 115 can include requisite physical hardware and software to create and manage a virtualization infrastructure. The physical hardware for a server 115 can include a CPU, graphics card, data bus, memory, and other components. In some examples, the servers 115 can include a pre-configured, hyper-converged computing device where a hyper-converged computing device includes pre-tested, pre-configured, and pre-integrated storage, server and network components, including software, that are positioned in an enclosure installed in a slot 124 on a rack 112.

Additionally, if a server 115 includes an instance of a virtual machine, the server 115 can be referred to as a "host," while the virtual machine can be referred to as a "guest." Each server 115 that acts as a host in the networked environment 100, and thereby includes one or more guest virtual machines, can also include a hypervisor. In some examples, the hypervisor can be installed on a server 115 to support a virtual machine execution space within which one or more virtual machines can be concurrently instantiated and executed. In some examples, the hypervisor can include the VMware ESX™ hypervisor, the VMware ESXi™ hypervisor, or similar hypervisor. It is understood that the computing clusters 106 are scalable, meaning that the computing clusters 106 in the networked environment 100 can be scaled dynamically to include additional servers 115, switches 118, and other components, without degrading performance of the virtualization environment. Moreover, the additional servers 115 and switches need not be located in the same rack 112 or the same facility. For example, a computing cluster 106 could be formed from a collection of servers 115 and switches 118 located in multiple racks 112 positioned in one or more data centers. In some examples, the hosts in the computing cluster 106 are monitored and, in the event of a failure, the virtual machines or virtual appliances on a failed host are restarted on alternate hosts.

In various examples, when a host (e.g., a physical server) is added to a computing cluster 106, an agent application can be uploaded to the host and configured to communicate with other agent applications in the computing cluster 106. Some of the hosts in the computing cluster 106 can be designated as primary hosts, and other hosts in the computing cluster 106 can be designated as secondary hosts. The primary hosts, for example, can maintain and replicate states of the computing cluster 106 and can be used to initiate failover actions. Any host that joins the computing cluster 106 can communicate with a host, such as an existing primary host, to complete its configuration.

The computing environment 103 can include, for example, a server 115 or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. Although shown separately from the computing clusters 106, it is understood that in some examples the computing clusters 106 can be a portion of the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing clusters 106 and client devices 108 for end users over the network 109, sometimes remotely, the computing environment 103 can be described as a remote computing environment 103 in some examples. Additionally, in some examples, the computing environment 103 can be implemented in servers 115 of a rack 112 and can manage operations of a virtualized computing environment. Hence, in some examples, the computing environment 103 can be referred to as a management cluster for the computing clusters 106.

The computing environment 103 can include a data store 130. The data store 130 can include memory of the computing environment 103, mass storage resources of the computing environment 103, or any other storage resources on which data can be stored by the computing environment 103. The data store 130 can include memory of the servers 115 in some examples. In some examples, the data store 130 can include one or more relational databases, object-oriented databases, hierarchical databases, hash tables or similar key-value data stores, as well as other data storage applications or data structures. The data stored in the data store 130, for example, can be associated with the operation of the various services or functional entities described below. For example, one or more resource usage rules 131, a free host queue, and an overcommitted cluster queue 136 can be stored in the data store 130.

A resource usage rule 131 represents a policy, threshold, or condition regarding consumption of computing resources by a computing cluster 106 or individual servers 115 within a computing cluster 106. Resource usage rules 131 can specify minimum amounts of computing resources that should be assigned to a computing cluster 106 (e.g., a minimum number of servers 115 assigned to a computing cluster 106 to provide for a minimum or baseline amount of capacity). Resource usage rules 131 can also specify maximum amounts of computing resources that can be consumed by a computing cluster 106 or servers 115 of a computing cluster 106. For example, a resource usage rule 131 can specify that the average processor utilization of servers 115 within a computing cluster 106 cannot exceed sixty percent or some other threshold value. As another example, a resource usage rule 131 can specify that the average memory consumption of servers 115 assigned to a computing cluster 106 cannot exceed eighty percent or some other threshold. Resource usage rules 131 can be created that specify limits or thresholds for other computing types of computing resources or performance metrics (e.g., bandwidth utilization, latency responding to requests, storage utilization, GPU utilization, etc.). When a computing cluster 106 is found to violate one or more resource usage rules 131, the computing cluster 106 can be considered to be overcommitted, under provisioned, or otherwise lacking adequate resources to handle the load or tasks assigned to the computing cluster 106.

The free host queue 133 represents a set or list of servers 115 which have been placed in a low-power state (e.g., idle, standby, sleep, maintenance mode, etc.). For example, the individual servers 115 included in the free host queue 133 cannot currently be needed to meet the computational demands or load of the respective computing clusters 106 to which the servers 115 are assigned. Therefore, individual servers 115 included in the free host queue 133 are available for reassignment to another computing cluster 106 which currently has insufficient resources to handle the demand or load it is experiencing.

The free host queue 133 can include one or more host identifiers 138 in order to track which hosts (e.g., servers 115) are available for reassignment to another computing cluster 106. A host identifier 138 can represent an identifier that uniquely represents a host (e.g., a server 115) with respect to other hosts. The host identifier 138 can include a serial number, a unique character string (e.g., a host or machine name), a universally unique identifier (UUID), a globally unique identifier (GUID), a media access control (MAC) address of a network interface installed in the server 115, or similarly unique identifiers.

The overcommitted cluster queue 136 can represent a set or list of computing clusters 106 with insufficient computing resources (e.g., an insufficient number of switches 118 or servers 115) to handle the demand or load that the computing clusters 106 are experiencing. Accordingly, the overcommitted cluster queue 136 can include one or more cluster identifiers 140 that uniquely identify individual computing clusters 106 with respect to other computing clusters 106. Examples of cluster identifiers 140 include unique numbers (e.g., an identification number that is incrementally generated when a new computing cluster 106 is created), a unique character string (e.g., a cluster name), a universally unique identifier (UUID), a globally unique identifier (GUID), or similarly unique identifier.

Various applications can be executed on the computing environment 103. For example, a resource management service 142 can be executed by the computing environment 103. Although the functionality provided by the resource management service 142 is discussed as being provided by a single service, the functionality attributed to the resource management service 142 can be split across multiple applications or services. For example, some of the functionality attributed to the resource management service 142 might be implemented by a first application or process, while other functionality might be implemented by other applications or processes. Other applications, services, processes, systems, engines, or functionality not discussed in detail herein can also be executed or implemented by the computing environment 103.

Further, various physical and virtual components of the computing clusters 106 can process workloads 145a . . . 145f. Workloads 145 can refer to the amount of processing that a server 115, switch 118, or other physical or virtual component of a computing cluster 106 has been instructed to process or route at a given time. Individual workloads 145 can be spread across multiple servers 115 within a computing cluster 106, and a computing cluster 106 can be assigned multiple workloads 145. The workloads 145 can be associated with virtual machines or other software executing on the servers 115.

The resource management service 142 can be executed to allocate servers 115 to a computing cluster 106 in response to changes to the workloads 145 hosted by the computing clusters 106. For example, the resource management service 142 can be configured to cause one or more servers 115 within a computing cluster 106 to be powered off or enter a low-power consumption mode of operation (e.g., standby, sleep, or maintenance modes). For instance, the resource management service 142 could determine that the workloads 145 being processed by a computer cluster 106 that includes five servers 115 is only consuming the resources of an equivalent of two servers 115. Accordingly, the resource management service 142 could remove three servers 115 from the workload 145, cause the VMs in the workload 145 executing on the removed servers 115 to migrate to the remaining two servers 115 assigned to the workload 145, and send instructions to the removed servers 115 to power off or enter a low-power mode of operation. Similarly, the resource management service 142 could determine that a computing cluster 106 that includes four servers 115 requires additional resources to manage the workloads 145 assigned to it. In response, the resource management service 142 could send instructions to one or more of the servers 115 removed from the first computing cluster 106 to power-on or resume from a standby, sleep, or maintenance mode. The instructions could further cause the servers 115 to be configured to operate as a logical part of the second computing cluster 106.

Figure 2:
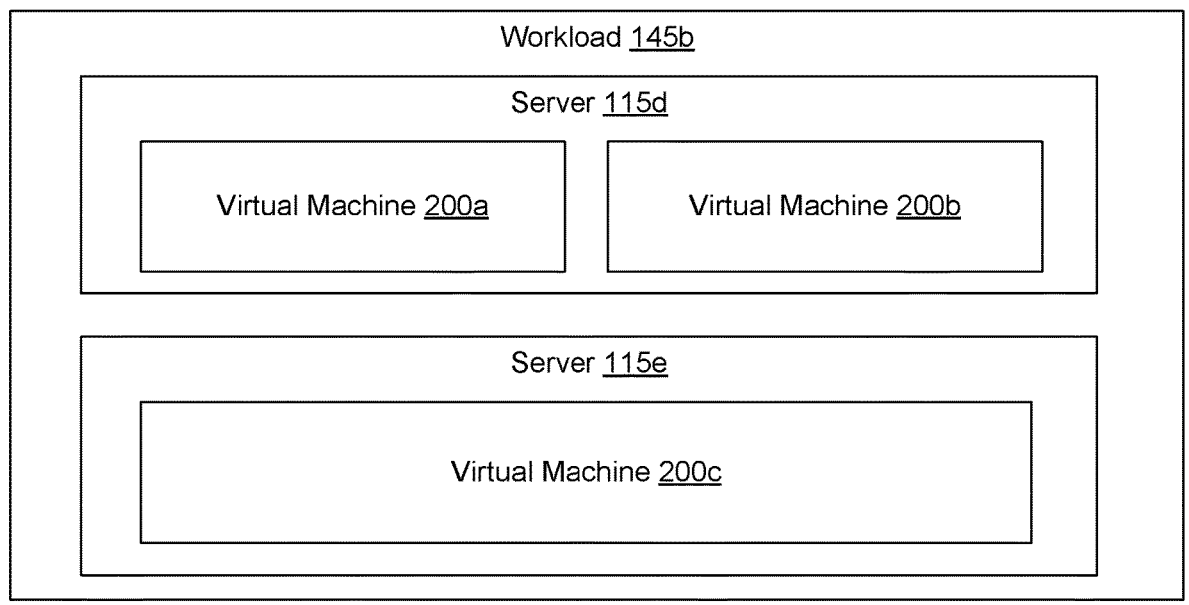
FIG. 2 is a drawing illustrating an example arrangement of VMs assigned to a workload in the virtualization environment depicted in FIG. 1.

Proceeding to FIG. 2, shown is an illustration of an example distribution of a workload 145. As illustrated, the workload 145b is spread across two servers 115, server 115d and server 115e. In this example, two virtual machines 200a and 200b are assigned as guests of the host server 115d, while a third virtual machine 200c is assigned as a guest of the host server 115e. These assignments can have been allocated by the resource management service 142 in order to make the most efficient use of available computing resources provided by the servers 115d and 115e. For example, the resource management service 142 can have assigned the virtual machine 200c to its own host, server 115e, upon determining that neither server 115d nor server 115d had sufficient available computing resources to execute virtual machine 200c alongside another virtual machine. Likewise, the resource management service 142 can have assigned virtual machines 200a and 200b to server 115d in response to a determination that server 115d had sufficient computing resources to host both virtual machines 200a and 200b without any performance impact.

Next, a general description of the operation of the various components of the servers 115 of FIG. 1 and FIG. 2 within the network environment of FIG. 1 is provided. More detailed description of the operation of specific components is provided in the following flowcharts of FIGS. 3 and 4.

To begin, the resource management service 142 assigns one or more servers 115 to a computing cluster 106. The number of servers 115 assigned can be based on one or more factors, such as the anticipated number and type or workloads 145 that will be assigned to or handled by the computing cluster 106 and the computing resources provided by the individual servers 115. However, other factors can also be considered, such as whether there is a predefined minimum number of servers 115 specified to assign to computing cluster 106 to maintain a minimum level of capability for the computing cluster 106.

The resource management service 142 can then monitor the resource usage of individual computing clusters 106. For example, the resource management service 142 can determine whether there are unused servers 115 within a computing cluster 106 (e.g., a server 115 that has not been assigned to any workloads 145 handled by the cluster 106). As another example, the resource management service 142 can monitor the resource usage of individual servers 115 (e.g., processor consumption, memory consumption, bandwidth consumption, etc.) and determine whether one or more workloads 145 handled by a computing cluster 106 could be consolidated to a smaller number of servers 115.

The resource management service 142 can monitor the resource usage of individual computing clusters 106 in a number of ways. Individual servers 115 could, for example, report their current state to the resource management service 142. The reporting could be performed by a hypervisor installed on the server 115 or another application that monitors resource usage of the server 115 and reports it to the resource management service 142. In some implementations, the individual servers 115 could report their resource usage on a periodic basis or at predefined intervals (e.g., every minute, every five minutes, every 15 minutes, every 30 minutes, every hour, etc.) to the resource management service 142. In other implementations, the resource management service 142 could send a request to individual servers 115 on a periodic basis or at predefined intervals (e.g., every minute, every five minutes, every 15 minutes, every 30 minutes, every hour, etc.) and receive a response indicating the current resource usage of individual servers 115 in the computing cluster 106.

The resource management service 142 can then perform one or more actions based on the usage reports received from the individual servers 115 in a computing cluster 106. For example, if a server 115 indicates that it is currently unused or unassigned to a workload 145 being processed by the computing cluster 106, the resource management service 142 can send a command to the server 115 to power-off or enter a low power state. The resource management service 142 might further send a command to the computing cluster 106 that causes the computing cluster 106 to remove the server 115 from its own internal list of available servers 115. In addition, the resource management service 142 could add a host identifier 138 of the server 115 to the free host queue 133. As another example, if the resource management service 142 determines that one or more servers 115 are underutilized based on predefined resource usage thresholds or criteria, the resource management service 142 might send one or more commands to the computing cluster 106 to consolidate the workloads 145 to a smaller number of servers 115 within the computing cluster 106. For instance, if a computing cluster 106 had three virtual machines 200 hosted on three servers 115 to service a web-application, and the resource management service 142 determined that the three servers 115 were under-utilized based on one or more predefined resource usage criteria, the resource management service 142 might send one or more commands to the computing cluster 106 to cause one of the virtual machines 200 to power-off and cause a corresponding server 115 to power-off or otherwise enter a low power state. This would cause the load from the web-application to be consolidated to the remaining virtual machines 200.

The resource management service 142 might then send a command to the computing cluster 106 that causes the computing cluster 106 to remove the server 115 from its own internal list of available servers 115. In addition, the resource management service 142 could add a host identifier 138 of the server 115 to the free host queue 133. As a result, the server 115 would be free for assignment to other computing clusters 106 when another computing cluster 106 needs additional computing resources.

The resource management service 142 can similarly monitor the resource usage of individual servers 115 assigned to a computing cluster 106 to determine if a computing cluster 106 has insufficient resources to handle the workloads 145 assigned to the computing cluster 106. For example, the resource management service 142 could determine that a predefined number or portion of servers 115 within the computing cluster 106 are exceeding maximum resource usage thresholds specified in one or more resource usage rules 131. For example, a resource usage rule 131 could specify that the average processor utilization for servers 115 within a computing cluster 106 should not exceed fifty percent or some other threshold. As another example, a resource usage rule 131 could specify that the average memory utilization for servers 115 within a computing cluster 106 should not exceed seventy percent or some other threshold. A similar resource usage rule 131 could be specified for network bandwidth or other computing resources. If a computing cluster 106 is determined to violate one or more resource usage rules 131, the resource management service 142 can add the cluster identifier 140 for the computing cluster 106 to the overcommitted cluster queue 136.

The resource management service 142 can also periodically query the overcommitted cluster queue 136 to determine whether any cluster identifiers 140 for computing clusters 106 are present. If there are no cluster identifiers 140 in the overcommitted cluster queue 136, then the resource management service 142 can determine that all of the computing clusters 106 are adequately provisioned with computing resources. However, if a cluster identifier 140 is present, then the resource management service 142 can determine or conclude that the respective computing cluster 106 is inadequately provisioned with computing resources.

In response, the resource management service 142 can query the free host queue 133 to determine whether any servers 115 are available to assign to the computing cluster 106 identified by the cluster identifier 140 in the overcommitted cluster queue 136. If a host identifier 138 is present in the free host queue 133, the resource management service 142 can assign the respective server 115 identified by the host identifier 138 to the computing cluster 106 identified by the cluster identifier 140. After assigning the server to the computing cluster 106, the resource management service 142 can then determine whether the computing cluster 106 satisfies the resource usage rules 131, indicating that the computing cluster 106 is appropriately provisioned. If the computing cluster 106 is not adequately provisioned with servers 115, the resource management service 142 can add additional servers 115 identified in the free host queue 133 to the computing cluster 106 until the computing cluster 106 is adequately provisioned with servers 115. Once the resource management service 142 determines that the computing cluster 106 is adequately provisioned with servers 115 to handle the workloads 145 assigned to the computing cluster 106, the resource management service 142 can remove the cluster identifier 140 from the overcommitted cluster queue 135.

Figure 3:
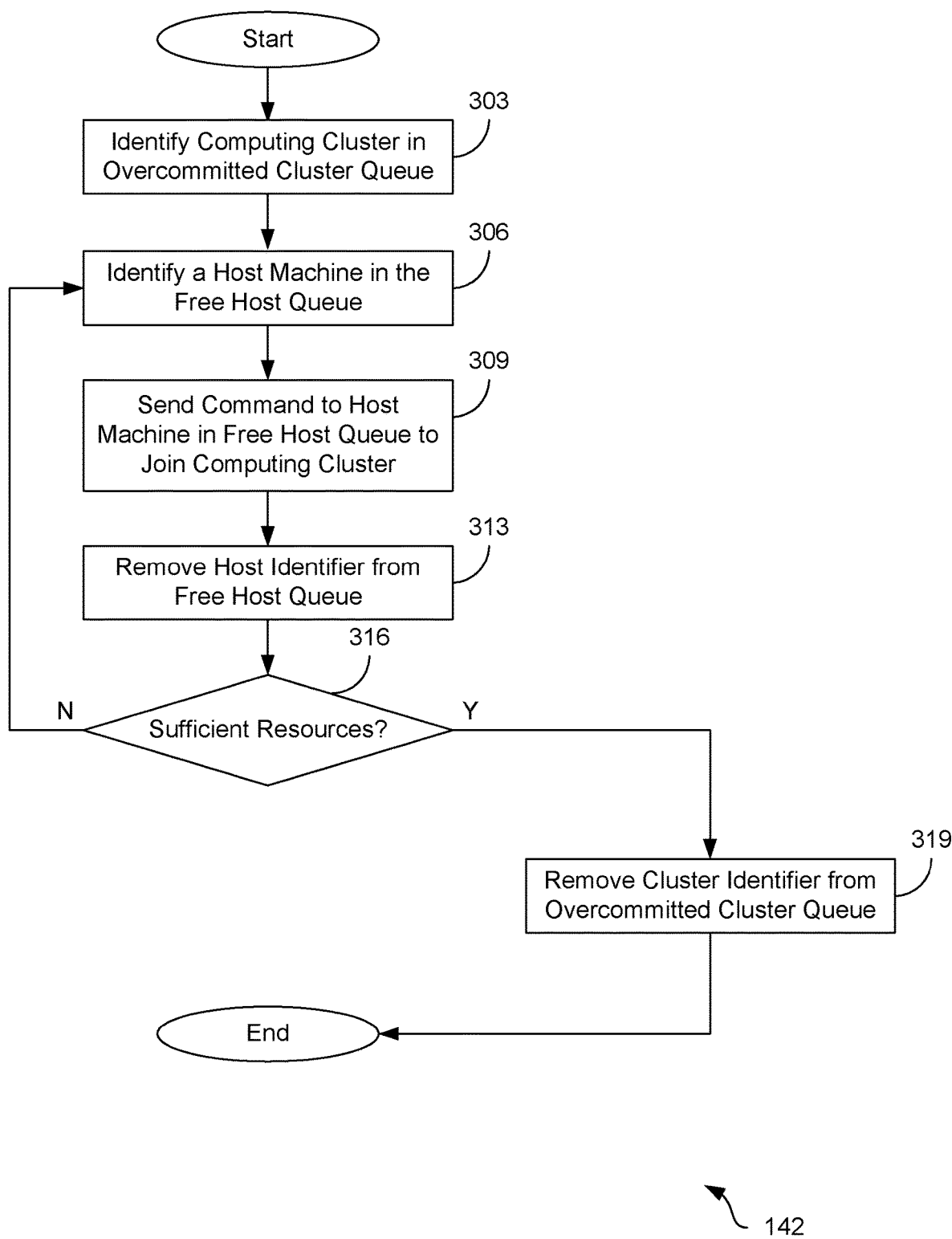
FIG. 3 and FIG. 4 are flowcharts representing the implementation of functionality provided by components of the virtualization environment depicted in FIG. 1.

Moving on to FIG. 3, shown is a flowchart that provides one example of the operation of a portion of the networked environment 100. The flowchart of FIG. 3 can be viewed as depicting an example of elements of a method implemented by the resource management service 142 or by the resource management service 142 executing in the computing environment 103 according to one or more examples. The separation or segmentation of functionality as discussed herein is presented for illustrative purposes only.

Beginning at step 303, the resource management service 142 identifies a computing cluster 106 that is assigned to the overcommitted cluster queue 136. For example, the resource management service 142 could query or otherwise evaluate the overcommitted cluster queue 136 to determine whether a cluster identifier 140 for a computing cluster 106 is present in the overcommitted cluster queue 136. If no cluster identifier 140 is in the overcommitted cluster queue 136, indicating that the computing clusters 106 are currently adequately provisioned with computing resources, then the resource management service 142 can poll the overcommitted cluster queue 136 until a cluster identifier 140 has been added.

Then at step 306, the resource management service 142 identifies a host machine, such as a server 115, assigned to the free host queue 133. For example, the resource management service 142 could query or otherwise evaluate the free host queue 133 to determine whether a host identifier 138 for a host machine, such as a server 115, is present in the free host queue 133. If no host identifier 138 is present in the free host queue 133, then the resource management service 142 could determine that no servers 115 are currently available for assignment to the computing cluster 106. In this instance, the resource management service 142 could poll the free host queue 133 until a host identifier 138 is added to the free host queue 133. If a host identifier 138 is present in the free host queue 133, then the resource management service 142 could conclude that a host machine, such as a server 115, is available for assignment to the computing cluster 106.

Moving on to step 309, the resource management service 142 can send a command to the host machine identified by the host identifier 138 in the free host queue 133 to join the computing cluster 106. The command could include provisioning or configuration related to the computing cluster, such as the cluster identifier 140 of the computing cluster, network configuration settings for the computing cluster 106, application or system configuration settings for the computing cluster 106, an identifier for and a location of a machine or disk image to be used by the host machine or server 115, and potentially other data. The command, when received by the host machine, such as a server 115, can also cause the host machine to power-on or otherwise exist a low-power state or maintenance mode.

Next at step 313, the resource management service 142 removes the host identifier 138 from the free host queue 133. Removal of the host identifier 138 from the free host queue 133 indicates that the respective host machine or server 115 is no longer available for assignment or reassignment to a computing cluster 106. If the host identifier 138 were the only host identifier 138 remaining in the free host queue 133, this would also indicate that there were no free host machines or servers 115 available for assignment to inadequately provisioned computing clusters 106.

Proceeding to step 316, the resource management service 142 determines whether the computing cluster 106 has sufficient computing resources (e.g., a sufficient number of servers 115) to process or otherwise handle or address the workloads 145 assigned to the computing cluster 106. For example, the resource management service 142 can review resource usage data received from servers 115 in the computing cluster 106 after assignment of the additional host machine or server 115 to determine if any resource usage rules 131 are being violated by the computing cluster 106 after assignment of the additional host machine to the computing cluster 106. For instance, if a resource usage rule 131 specifies that the average processor load on servers 115 in a computing cluster 106 cannot exceed fifty percent, and the average processor load on servers 115 in the computing cluster 106 decreases from fifty-seven percent to forty-eight percent after the additional server 115 is added, then the resource management service 142 could determine that the computing cluster 106 is not adequately provisioned. This type of check could be performed for each applicable resource usage rule 131 (e.g., for memory usage, network bandwidth usage, graphics processor usage, etc.).

If any of the applicable resource usage rules 131 continue to be violated, then the resource management service 142 could determine that the computing cluster 106 does not yet have sufficient computing resources. In this case, the resource management service 142 can attempt to assign additional host machines (e.g., servers 115) to the computing cluster 106. For example, the resource management service 142 can check the free host queue 133 to determine whether any additional host machines are available to assign to the computing cluster 106. Accordingly, the resource management service 142 can loop back to step 306 and repeat the previously described steps until a sufficient number of host machines, if available, are added to the computing cluster 106 for the computing cluster to comply with all applicable resource usage rules 131.

However, if all of the applicable resource usage rules 131 are satisfied, the resource management service 142 could determine that the computing cluster 106 is adequately provisioned with computing resources. In this case, the process would continue to step 319. Here, the resource management service 142 would remove the cluster identifier 140 of the computing cluster 106 from the overcommitted cluster queue 136. Removal of the cluster identifier 140 from the overcommitted cluster queue 136 can serve as an indication that a computing cluster 106 has an adequate number of computing resources assigned to it. Accordingly, removal can also prevent additional, unnecessary computing resources from being added to the computing cluster 106 at the expense of other computing clusters 106 that are insufficiently provisioned with computing resources.

Figure 4:
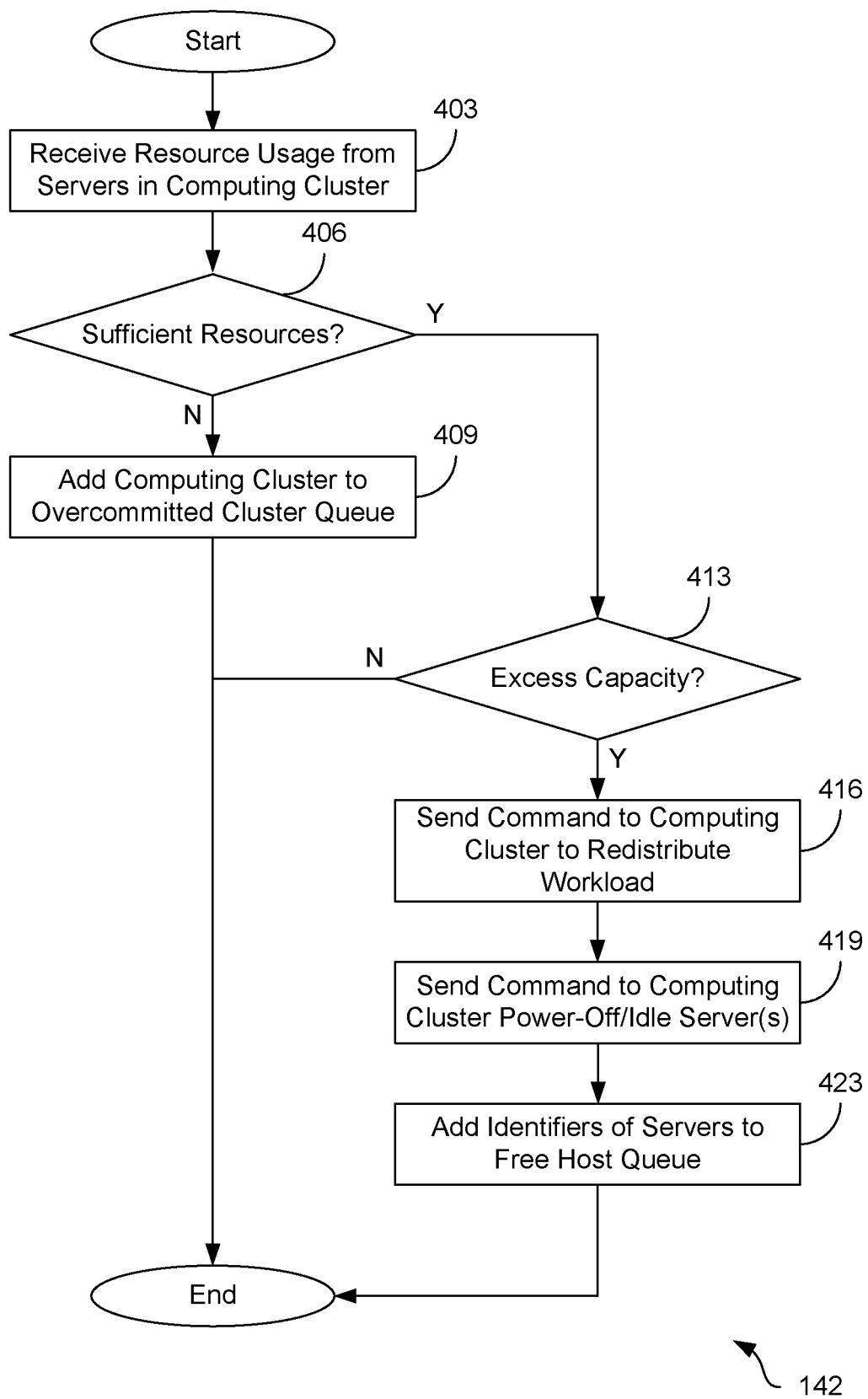

Moving on to FIG. 4, shown is a flowchart that provides one example of the operation of a portion of the networked environment 100. The flowchart of FIG. 4 can be viewed as depicting an example of elements of a method implemented by the resource management service 142 or by the resource management service 142 executing in the computing environment 103 according to one or more examples. The separation or segmentation of functionality as discussed herein is presented for illustrative purposes only.

Beginning with step 403, the resource management service 142 can receive resource usage data, such as reports, from servers 115, network devices (e.g., switches 118), or other host machines or computing resources assigned to a computing cluster 106. The resource usage data from each computing resource can include a cluster identifier 140 to associate the resource usage data with a particular computing cluster 106. The resource usage data from each computing resource or host machine (e.g., server 115) can include information such as the current processor utilization, the current memory utilization, the current network bandwidth utilization, or other utilization metrics for the device. In some instances, the resource usage data can be provided by the individual devices in the computing cluster 106 on a periodic basis. In other instances, the resource management service 142 can send requests on a periodic basis to the devices or computing resources in the computing cluster 106 (e.g., a multicast or broadcast request) and receive the resource usage data in response.

Then at step 406, the resource management service 142 determines whether the computing cluster 106 has sufficient computing resources (e.g., a sufficient number of servers 115) to process or otherwise handle or address the workloads 145 assigned to the computing cluster 106. For example, the resource management service 142 can review resource usage data received from servers 115 in the computing cluster 106 to determine if any resource usage rules 131 are currently being violated by the computing cluster 106. For instance, if a resource usage rule 131 specifies that the average processor load on servers 115 in a computing cluster 106 cannot exceed fifty percent, and the average processor load on servers 115 in the computing cluster 106 is determined to currently be sixty-two percent, then the resource management service 142 could determine that the computing cluster 106 is not currently adequately provisioned. This type of check could be performed for each applicable resource usage rule 131 (e.g., for memory usage, network bandwidth usage, graphics processor usage, etc.). Accordingly, if one or more resource usage rules 131 are determined to be violated by the computing cluster 106, then the process proceeds to step 409. However, if all of the applicable resource usage rules 131 are satisfied, the resource management service 142 could determine that the computing cluster 106 is adequately provisioned with computing resources. In this case, the process can continue to step 413 instead.

If the resource management service 142 proceeds to step 409, then the resource management service 142 can add the computing cluster 106 to the overcommitted cluster queue 136. For example, the resource management service 142 could add the cluster identifier 140 to the overcommitted cluster queue 136. Once the cluster identifier 140 is added, this could indicate that the computing cluster 106 is insufficiently provisioned with computing resources. Other processes of the resource management service 142 could then attempt to provide additional capacity to the computing cluster 106 using the approaches previously described. The process then subsequently ends.

However, if the resource management service 142 proceeds to step 413, the resource management service 142 can then determine whether the computing cluster 106 has excess capacity. For instance, the computing cluster 106 can have computing resources or host machines (e.g., servers 115) which are unutilized or underutilized. Removing such unutilized or underutilized servers 115 from the computing cluster 106 cannot noticeably impact the performance of the workloads 145 assigned to the computing cluster 106. As an example, a web-application that requires six servers 115 to adequately handle user requests during peak hours can only need two servers 115 to adequately handle user requests during off-peak hours.

The resource management service 142 can evaluate whether the computing cluster 106 has additional or excess capacity based on the previously received resource usage data. For example, the resource management service 142 could predict the amount that the average utilization of a computing resource (e.g., processor usage, memory usage, bandwidth usage, etc.) would increase in response to removal of a host machine (e.g., a server 115) from the computing cluster 106. If one of the resource usage rules 131 were predicted to be violated upon removal of a server 115, then the resource management service 142 could conclude that the computing cluster 106 did not have any excess computing capacity. However, if the resource management service 142 predicted that none of the resource usage rules 131 would be violated upon removal of a server 115, then the resource management service 142 could conclude that the computing cluster 106 did in fact have excess computing capacity.

In some implementations, however, the resource management service 142 cannot attempt to predict or otherwise determine whether the computing cluster 106 has excess computing capacity. Instead, the resource management service 142 could instead remove host machines (e.g., servers 115) from the computing cluster 106. In these implementations, if the computing cluster 106 failed to satisfy one or more resource usage rules 131 after removal of a server 115 from the computing cluster 106, the resource management service 142 would later add the computing cluster 106 to the overcommitted cluster queue 136, which would result in the server 115 being added back to the computing cluster 106.

If the resource management service 142 proceeds to step 416, the resource management service 142 first sends a command to the computing cluster 106 to redistribute one or more workloads 145 within the computing cluster 106. The redistribution of the workloads 145 to other servers 115 within the computing cluster 106 allows for a server 115 to be removed from the computing cluster 106 without impacting the workloads 145.

Then at step 419, the resource management service 142 can send a command to the computing cluster 106 to power-off a server 115 or otherwise cause the server 115 to enter a low-power or idle state, such as a maintenance mode. When the server 115 powers-off or enters the low-power or idle state, the server 115 can no longer be available to the computing cluster 106 for use by one or more of the workloads 145. In response, the resource management service 142 can receive from the computing cluster 106 a host identifier 138 for a server 115 that is powered-off or in a low-power state and therefore available for reassignment to another computing cluster 106. In some instances, the resource management service 142 can receive multiple host identifiers 138 (e.g., when the computing cluster 106 consolidated the workloads 145 from multiple servers 115 and powered them off or otherwise cause the servers 115 to enter a low-power state).

Proceeding to step 423, the resource management service 142 adds the received host identifier 138 to the free host queue 133. The process then ends.

Although the resource management service 142 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
    a computing device comprising a processor and a memory;
    machine readable instructions stored in the memory that, when executed by the processor, cause the computing device to at least:
        identify a computing cluster assigned to a first queue, the first queue comprising a first list of identifiers of computing clusters with insufficient resources for a respective workload;
        identify a host machine assigned to a second queue, the second queue comprising a second list of identifiers of host machines in an idle state;
        send a command to the host machine to join to the computing cluster; and
        remove a host identifier for the host machine from the second queue.

2. The system of claim 1, wherein the machine readable instructions further cause the computing device to at least:
    in response to the host machine joining the computing cluster, evaluate the computing cluster to determine that the computing cluster has sufficient resources for the respective workload; and
    remove the computing cluster from the first queue.

3. The system of claim 1, wherein the host machine is a first host machine assigned to the second queue, the command is a first command, and the machine readable instructions further cause the computing device to at least:
    in response to the first host machine joining the computing cluster, evaluate the computing cluster to determine that the computing cluster continues to have insufficient resources for the respective workload;
    identify a second host machine assigned to the second queue; and
    send a second command to the second host machine to migrate to the computing cluster.

4. The system of claim 1, wherein the machine readable instructions further cause the computing device to at least:
    evaluate the computing cluster to determine that the computing cluster has insufficient resources for the respective workload; and
    add the computing cluster to the first queue in response to a determination that the computing cluster has insufficient resources for the respective workload.

5. The system of claim 1, wherein the computing cluster is a first computing cluster and the machine readable instructions further cause the computing device to at least:
    evaluate a second computing cluster to determine that the second computing cluster has insufficient resources for the respective workload; and
    add the second computing cluster to the first queue in response to a determination that the second computing cluster has insufficient resources for the respective workload.

6. The system of claim 1, wherein the computing cluster is a first computing cluster, the command is a first command, and the machine readable instructions further cause the computing device to at least:
    evaluate a second computing cluster to determine that host machine can be unassigned from the second computing cluster;
    send a second command to the host machine to enter the idle state;
    send a third command to the second computing cluster to redistribute the respective workload to other computing resources assigned to the second computing cluster; and
    add an identifier of the host machine to the second queue.

7. The system of claim 6, wherein a determination that the host machine can be unassigned from the second computing cluster is based at least in part on a resource usage rule.

8. A method, comprising:
    identifying a computing cluster assigned to a first queue, the first queue comprising a first list of identifiers of computing clusters with insufficient resources for a respective workload;
    identifying a host machine assigned to a second queue, the second queue comprising a second list of identifiers of host machines in an idle state;
    sending a command to the host machine to join to the computing cluster; and
    removing the host machine from the second queue.

9. The method of claim 8, wherein the method further comprises:
    in response to the host machine joining the computing cluster, evaluating the computing cluster to determine that the computing cluster has sufficient resources for the respective workload; and
    removing the computing cluster from the first queue.

10. The method of claim 8, wherein the host machine is a first host machine assigned to the second queue, the command is a first command, and the method further comprises:
    in response to the first host machine joining the computing cluster, evaluating the computing cluster to determine that the computing cluster continues to have insufficient resources for the respective workload;
    identifying a second host machine assigned to the second queue; and
    sending a second command to the second host machine to migrate to the computing cluster.

11. The method of claim 8, wherein the method further comprises:
    evaluating the computing cluster to determine that the computing cluster has insufficient resources for the respective workload; and adding the computing cluster to the first queue in response to a determination that the computing cluster has insufficient resources for the respective workload.

12. The method of claim 8, wherein the computing cluster is a first computing cluster and the method further comprises:
evaluating a second computing cluster to determine that the second computing cluster has insufficient resources for the respective workload; and
adding the second computing cluster to the first queue in response to a determination that the second computing cluster has insufficient resources for the respective workload.

13. The method of claim 8, wherein the computing cluster is a first computing cluster, the command is a first command, and the method further comprises:
evaluating a second computing cluster to determine that host machine can be unassigned from the second computing cluster;
sending a second command to the host machine to enter the idle state;
sending a third command to the second computing cluster to redistribute the respective workload to other computing resources assigned to the second computing cluster; and
adding an identifier of the host machine to the second queue.

14. The method of claim 13, wherein a determination that the host machine can be unassigned from the second computing cluster is based at least in part on a resource usage rule.

15. A non-transitory computer-readable medium comprising machine readable instructions that, when executed by a processor, cause a computing device to at least:
identify a computing cluster assigned to a first queue, the first queue comprising a first list of identifiers of computing clusters with insufficient resources for a respective workload;
identify a host machine assigned to a second queue, the second queue comprising a second list of identifiers of host machines in an idle state;
send a command to the host machine to join to the computing cluster; and
remove the host machine from the second queue.

16. The non-transitory computer-readable medium of claim 15, wherein the machine readable instructions further cause the computing device to at least:
in response to migration of the host machine joining the computing cluster, evaluate the computing cluster to determine that the computing cluster has sufficient resources for the respective workload; and
remove the computing cluster from the first queue.

17. The non-transitory computer-readable medium of claim 15, wherein the host machine is a first host machine assigned to the second queue, the command is a first command, and the machine readable instructions further cause the computing device to at least:
in response to the first host machine joining the computing cluster, evaluate the computing cluster to determine that the computing cluster continues to have insufficient resources for the respective workload;
identify a second host machine assigned to the second queue; and
send a second command to the second host machine to migrate to the computing cluster.

18. The non-transitory computer-readable medium of claim 15, wherein the machine readable instructions further cause the computing device to at least:
evaluate the computing cluster to determine that the computing cluster has insufficient resources for the respective workload; and
add the computing cluster to the first queue in response to a determination that the computing cluster has insufficient resources for the respective workload.

19. The non-transitory computer-readable medium of claim 15, wherein the computing cluster is a first computing cluster and the machine readable instructions further cause the computing device to at least:
evaluate a second computing cluster to determine that the second computing cluster has insufficient resources for the respective workload; and
add the second computing cluster to the first queue in response to a determination that the second computing cluster has insufficient resources for the respective workload.

20. The non-transitory computer-readable medium of claim 15, wherein the computing cluster is a first computing cluster, the command is a first command, and the machine readable instructions further cause the computing device to at least:
evaluate a second computing cluster to determine that host machine can be unassigned from the second computing cluster;
send a second command to the host machine to enter the idle state;
send a third command to the second computing cluster to redistribute the respective workload to other computing resources assigned to the second computing cluster; and
add an identifier of the host machine to the second queue.

* * * * *